US009525799B2

(12) United States Patent
Yamamichi

(10) Patent No.: US 9,525,799 B2
(45) Date of Patent: Dec. 20, 2016

(54) INFORMATION PROCESSING APPARATUS, CONTROL METHOD, AND RECORDING MEDIUM FOR UPDATING THE TRANSMISSION RESULT OF A MULTI-ADDRESS TRANSMISSION

(71) Applicant: CANON KABUSHIKI KAISHA, Tokyo (JP)

(72) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/548,083

(22) Filed: Nov. 19, 2014

(65) Prior Publication Data
US 2015/0138598 A1 May 21, 2015

(30) Foreign Application Priority Data
Nov. 20, 2013 (JP) .................................. 2013-240035

(51) Int. Cl.
G06F 15/00 (2006.01)
H04N 1/32 (2006.01)
(52) U.S. Cl.
CPC ...... H04N 1/32641 (2013.01); H04N 1/32069 (2013.01); H04N 1/32074 (2013.01); H04N 1/32667 (2013.01)
(58) Field of Classification Search
None
See application file for complete search history.

(56) References Cited

U.S. PATENT DOCUMENTS

| | | | | |
|---|---|---|---|---|
| 5,729,595 A | * | 3/1998 | Kugell | H04N 1/00204 358/407 |
| 8,254,538 B1 | * | 8/2012 | Watts et al. | 379/100.01 |
| 2002/0075521 A1 | * | 6/2002 | Oobayashi | 358/402 |
| 2007/0143429 A1 | * | 6/2007 | Venkataraman | H04M 1/72547 709/206 |
| 2011/0228346 A1 | * | 9/2011 | Hoshino | 358/442 |
| 2012/0257234 A1 | * | 10/2012 | Kanuma | 358/1.13 |
| 2013/0293933 A1 | * | 11/2013 | Rebert et al. | 358/407 |

FOREIGN PATENT DOCUMENTS

JP 2003-333250 A 11/2003

* cited by examiner

Primary Examiner — Helen Q Zong
(74) Attorney, Agent, or Firm — Canon USA, Inc., IP Division

(57) ABSTRACT

If instruction information for a multi-address transmission for performing a FAX transmission to a plurality of destinations is transmitted, and if an acquired transmission result indicates failure of the FAX transmission to at least one of the destinations, a transmission result indicating failure of the multi-address transmission is displayed. After the instruction information for performing the FAX transmission again to a retransmission target destination to which FAX transmission has failed is transmitted to an image forming apparatus, a result of the FAX transmission performed based on the instruction information for performing the FAX transmission again to the retransmission target destination is acquired.

13 Claims, 17 Drawing Sheets

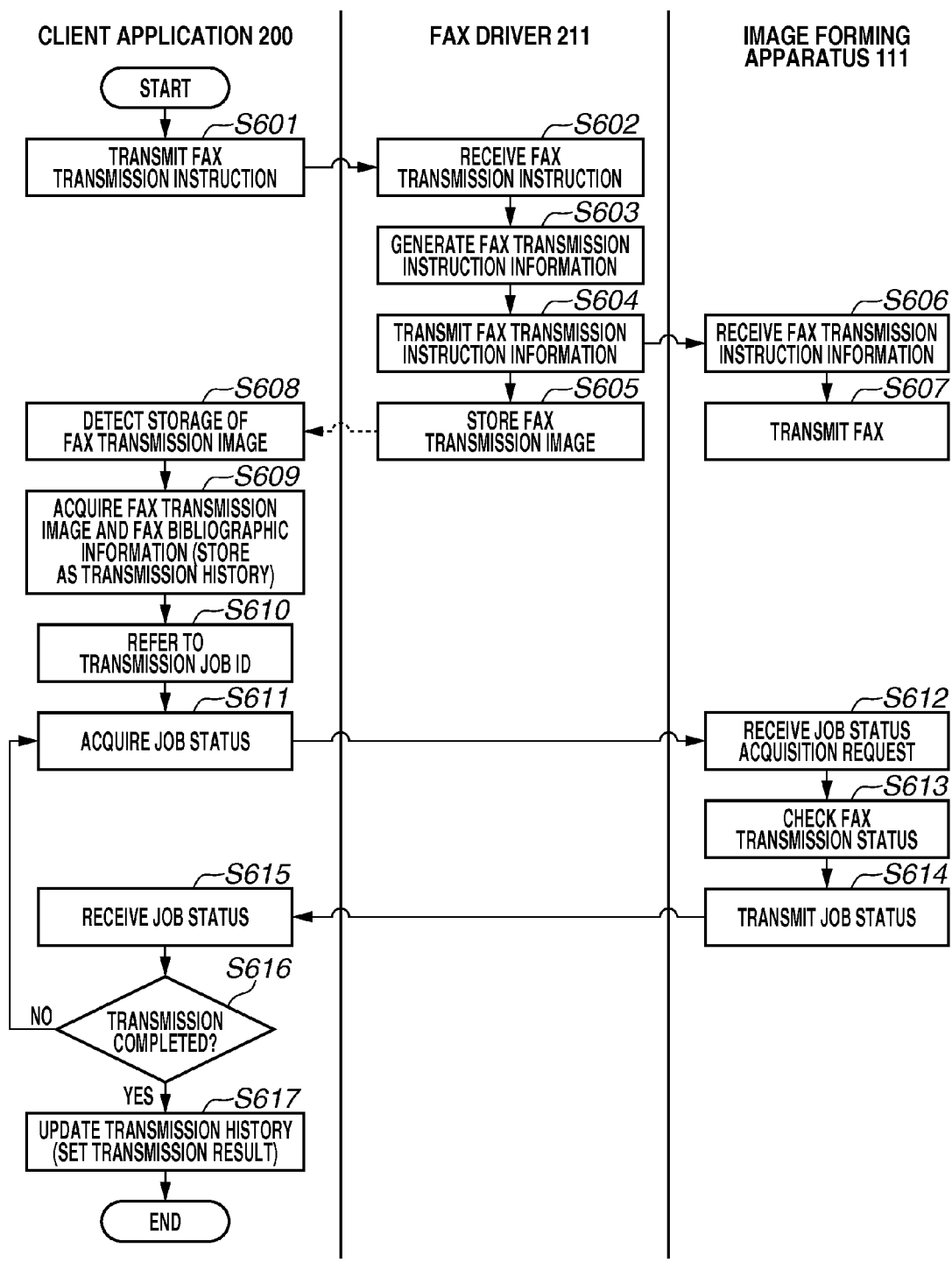

FIG.7B

720 Transmission History Summary

| Original Transmission History ID  A |
|---|
| Latest Transmission History ID  A |
| Summary Status  Failure |
| Document Name  DocA |
| Transmission Time 2013/05/12 17:54 |
| Destination Name 3 Destinations |
| Destination Number Multi-address Transmission |
| Destination-Specific Display Information List |
| Original Individual Destination Information Tom/111/Success — 721 |
| Original Individual Destination Information John/222/Failure |
| Original Individual Destination Information Anne/333/Failure |
| User Name  User1 |

740 FAX Transmission History

| Transmission History ID  A |
|---|
| Original Transmission History ID  Empty |
| Transmission Job ID  Empty |
| Document Name  DocA |
| User Name  User1 |
| Transmission Time 2013/05/12 17:54 |
| Destination Name  Tom |
| Destination Number  111 |
| Transmission Result  Success |
| Destination Name  John |
| Destination Number  222 |
| Transmission Result  Failure |
| Destination Name  Anne |
| Destination Number  333 |
| Transmission Result  Failure |

FIG.8A

800 Transmission History Summary

FAX History (summary)

| Status | Document Name | Transmission Time | Destination Name | Fax Number | Sender |
|---|---|---|---|---|---|
| Success | DocA | 2013/5/12 17:54 | 3 Destinations | Multi-address Transmission | user1 |
| Success | DocB | 2013/5/12 13:31 | ○△×.Inc | 123456789 | user2 |
| Success | DocB | 2013/5/12 11:54 | Bob ... | 122223333 | user3 |

801 Transmission Job History

811 History Selection Control Item

810 Detailed Transmission History

FAX History

History Displayed: [Display Latest Status ▼]

| Status | Destination Name | Fax Number | Transmission Time | Sender |
|---|---|---|---|---|
| Success | Tom .... | 111 | 2013/5/12 17:54 | User1... |
| Success | John .... | 222 | 2013/5/13 10:50 | User1... |
| Success | Anne .... | 333 | 2013/5/13 10:50 | User1... |

812 Detailed Transmission History

FAX History

History Displayed: [Display All ▼]

| Status | Destination Name | Fax Number | Transmission Time | Sender |
|---|---|---|---|---|
| Success | Tom .... | 111 | 2013/5/12 17:54 | User1... |
| Failure | John .... | 222 | 2013/5/12 17:54 | User1... |
| Failure | Anne .... | 333 | 2013/5/12 17:54 | User1... |
| Success | John .... | 444 | 2013/5/13 10:50 | User1... |
| Success | Anne .... | 333 | 2013/5/13 10:50 | User1... |

FIG. 8B

820 FAX Transmission History Summary

| Field | Value |
|---|---|
| Original Transmission History ID | A |
| Latest Transmission History ID | B |
| Summary Status | Success |
| Document Name | DocA |
| Transmission Time | 2013/05/13 10:50 |
| Destination Name | 3 Destinations |
| Destination Number | Multi-address Transmission |
| Destination-Specific Display Information | List |
| Original Destination-Specific Display Information | Tom/111/Success... |
| Original Destination-Specific Display Information | John/222/Failure... |
| Retransmission Destination-Specific Display Information | John/444/Success... |
| Original Destination-Specific Display Information | Anne/333/Failure... |
| Retransmission Destination-Specific Display Information | Anne/333/Success... |
| User Name | User1 |

840 FAX Transmission History

| Field | Value |
|---|---|
| Transmission History ID | A |
| Original Transmission History ID | Empty |
| Transmission Job ID | UID1 |
| Document Name | DocA |
| User Name | User1 |
| Transmission Time | 2013/05/12 17:54 |
| Destination Name | Tom |
| Destination Number | 111 |
| Transmission Result | Success |
| Destination Name | John |
| Destination Number | 222 |
| Transmission Result | Failure |
| Destination Name | Anne |
| Destination Number | 333 |
| Transmission Result | Failure |
| Transmission Setting | With Cover Sheet |

860 FAX Transmission History

| Field | Value |
|---|---|
| Transmission History ID | B |
| Original Transmission History ID | A |
| Transmission Job ID | Empty |
| Document Name | DocA |
| User Name | User1 |
| Transmission Time | 2013/05/13 10:50 |
| Destination Name | John |
| Destination Number | 444 |
| Transmission Result | Success |
| Destination Name | Anne |
| Destination Number | 333 |
| Transmission Result | Success |
| Transmission Setting | With Cover Sheet |

880 FAX Bibliographic Information

| Field | Value |
|---|---|
| Transmission Job ID | UID1 |
| Document Name | DocA |
| User Name | User1 |
| Transmission Time | 2013/05/13 10:50 |
| Transmission Setting | With Cover Sheet |
| Destination Information | |
| Destination Name | John |
| Destination Number | 444 |
| Destination Name | Anne |
| Destination Number | 333 |

FIG.12

FAX History (summary)

| Status | Document Name | Transmission Time | Destination Name | Fax Number | Sender |
|---|---|---|---|---|---|
| RETRANSMITTING | DocA | 2013/5/12 17:54 | 3 Destinations | Multi-address Transmission | user1 |
| Success | DocB | 2013/5/12 13:31 | ○□×.Inc | 123456789 | user2 |
| Success | DocC | 2013/5/12 11:54 | Bob… | 122223333 | user3 |

700 Transmission History Summary

Transmission Job History 701

Retransmit FAX 750

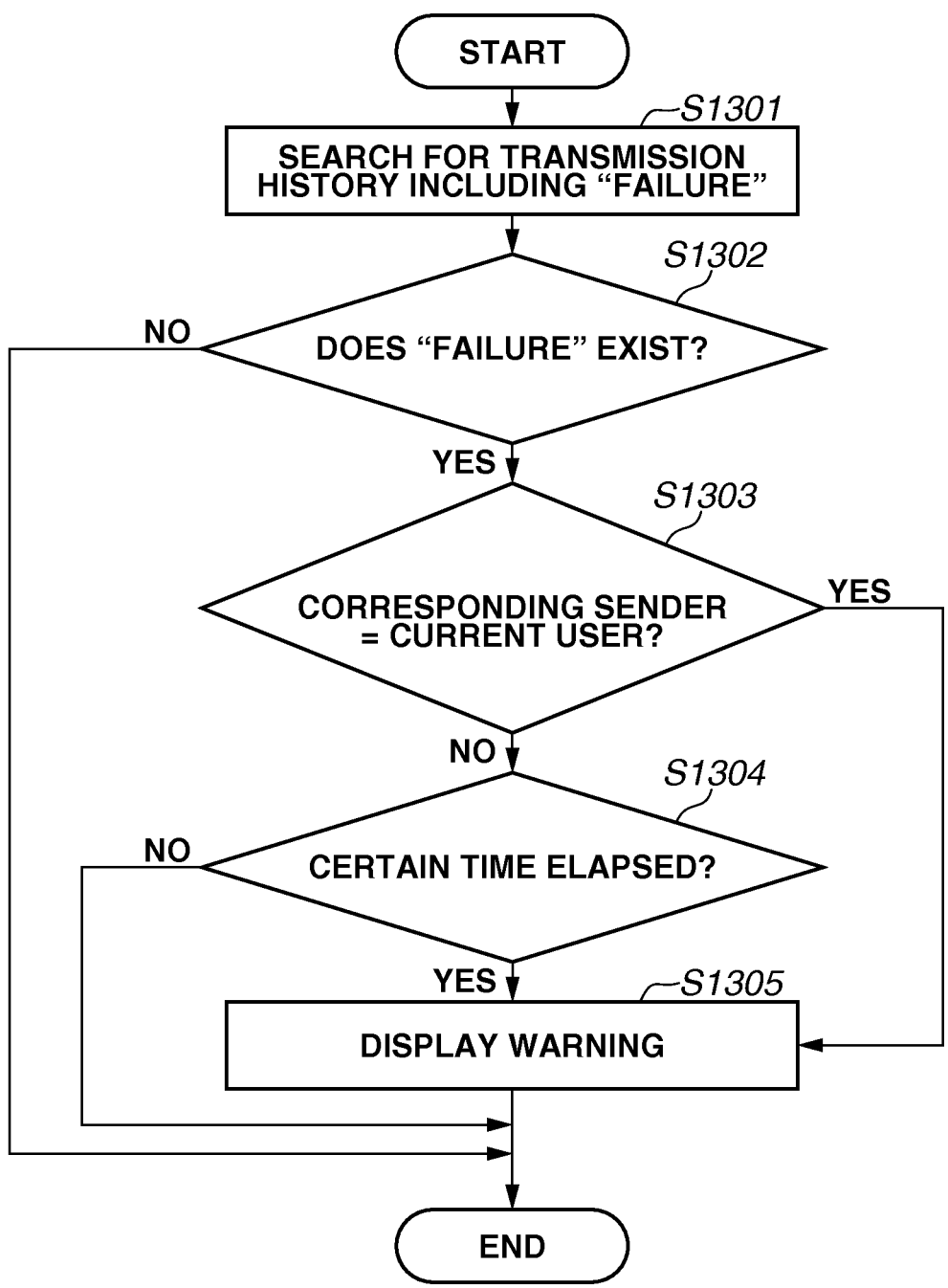

INFORMATION PROCESSING APPARATUS, CONTROL METHOD, AND RECORDING MEDIUM FOR UPDATING THE TRANSMISSION RESULT OF A MULTI-ADDRESS TRANSMISSION

BACKGROUND OF THE INVENTION

Field of the Invention

The present invention relates to a technique for giving a facsimile (FAX) transmission instruction.

Description of the Related Art

Japanese Patent Application Laid-Open No. 2003-333250 discusses a technique in which a facsimile apparatus performs FAX transmission by transmitting image data to the facsimile apparatus using a driver.

SUMMARY OF THE INVENTION

Even if an information processing apparatus transmits instruction information for transmitting a FAX to an image forming apparatus, the image forming apparatus may fail to transmit the FAX. Such a failure is caused, for example, if the image forming apparatus fails to transmit a FAX to a FAX destination due to a wrong number or interruption of a line. In another case, fax transmission fails when the image forming apparatus has not simply been started.

In addition, when a multi-address transmission for transmitting a FAX to a plurality of destinations is performed, FAX transmission to at least one of the destinations may fail. In this case, a FAX may be retransmitted to the destination that has failed to receive the FAX. However, if the transmission result of the multi-address transmission and the transmission result of the retransmission are displayed without being associated with each other, it is unclear whether FAX transmission of the multi-address transmission has finally successfully been completed or not.

Since Japanese Patent Application Laid-Open No. 2003-333250 does not discuss displaying FAX transmission results, it is also unclear whether FAX transmission has finally successfully been completed or not.

The present invention is directed to an information processing apparatus capable of displaying easy-to-understand information for users by updating the transmission result of a multi-address transmission with a transmission result acquired by retransmission.

According to an aspect of the present invention, an information processing apparatus includes a transmission unit configured to transmit instruction information for causing an image forming apparatus to perform FAX transmission to the image forming apparatus, an acquisition unit configured to acquire a result of the FAX transmission performed based on the instruction information from the image forming apparatus, a display unit configured to display, if the transmission unit transmits instruction information for a multi-address transmission for performing FAX transmission to a plurality of destinations and if the acquisition unit acquires a transmission result indicating failure of FAX transmission to at least one of the destinations, a transmission result indicating failure of the multi-address transmission, and an update unit configured to update, after the transmission unit transmits to the image forming apparatus instruction information for performing FAX transmission again to a retransmission target destination to which FAX transmission has failed and after the acquisition unit acquires a result of the FAX transmission performed based on the instruction information for performing the FAX transmission again to the retransmission target destination, the transmission result of the multi-address transmission from failure to success after the retransmission if the result of the FAX transmission to the retransmission target destination indicates that the FAX transmission by the retransmission has succeeded.

Further features of the present invention will become apparent from the following description of exemplary embodiments with reference to the attached drawings.

Further features of the present invention will become apparent from the following description of exemplary embodiments with reference to the attached drawings.

BRIEF DESCRIPTION OF THE DRAWINGS

FIGS. 6A and 6B are sequence diagrams illustrating FAX transmission processing.

FIGS. 7A and 7B illustrate contents and display of retransmission-related data of the FAX transmission history data before a retransmission.

FIGS. 8A and 8B illustrate contents and display of retransmission-related data of the FAX transmission history data after the retransmission.

FIG. 12 illustrates display during the retransmission of FAX transmission history data.

FIG. 13 is a flowchart illustrating processing for displaying a transmission result "Failure".

DESCRIPTION OF THE EMBODIMENTS

Various exemplary embodiments, features, and aspects of the invention will be described in detail below with reference to the drawings. The present invention is not limited to the exemplary embodiments. In addition, all the configurations described in the exemplary embodiments are not necessarily required as units of the exemplary embodiments to solve the problems.

[System Configuration and Hardware Configuration]

Figure 1A:
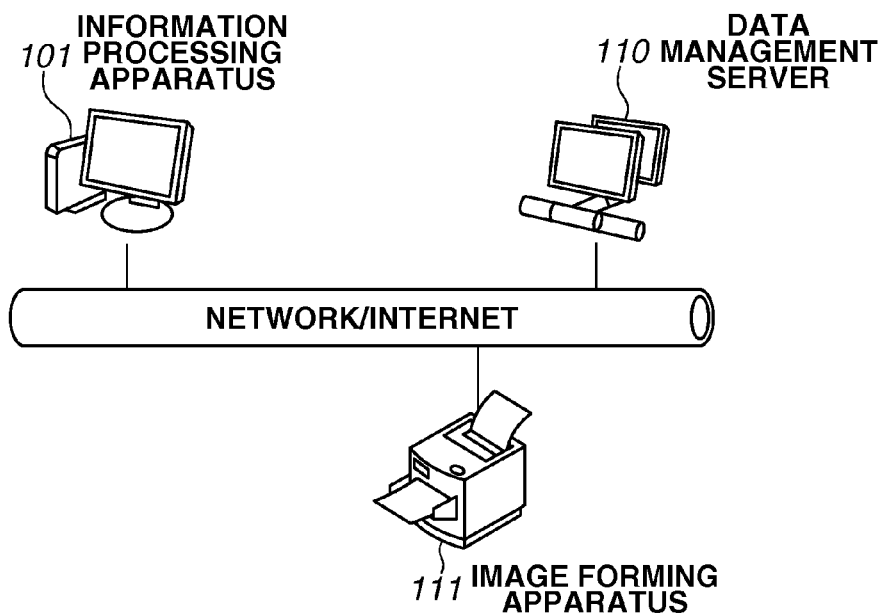
FIGS. 1A and 1B illustrate a system configuration and a hardware configuration, respectively.
Figure 1B:
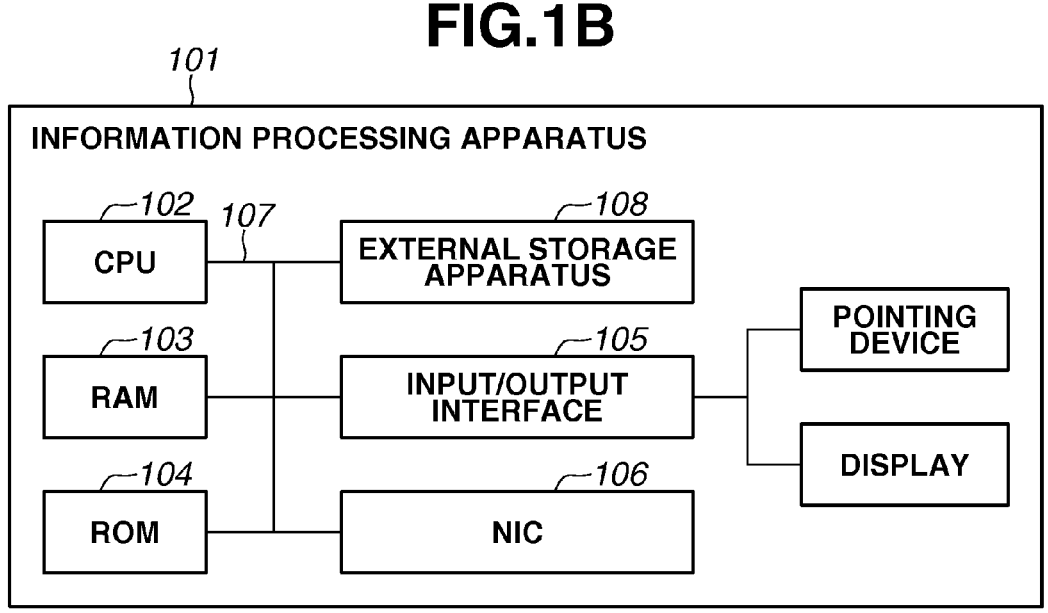

System and hardware configurations according to a first exemplary embodiment will be described with reference to FIGS. 1A and 1B, respectively. FIGS. 1A and 1B illustrate examples of the system and hardware configuration, respectively.

First, the system configuration will be described with reference to FIG. 1A. An information processing apparatus (e.g., computer) 101 is connected to a network and to the Internet via the network. A data management server 110, the information processing apparatus 101, and an image forming apparatus 111 are connected to the network or the Internet. In the present exemplary embodiment, the data management server 110 is an example of an external information processing apparatus. FIG. 1A illustrates only one information processing apparatus. However, a plurality of information processing apparatuses may be arranged. In addition, for example, the network and the Internet are wired or wireless communication networks that support the transmission control protocol/Internet protocol (TCP/IP) and the like.

Next, the hardware configuration will be described with reference to FIG. 1B. The information processing apparatus 101 includes a central processing unit (CPU) 102, a random access memory (RAM) 103, a read-only memory (ROM) 104, an input/output interface 105, a network interface card (NIC) 106, and a bus 107. In the present exemplary embodiment, the image forming apparatus 111 and the data management server 110 have a similar configuration to that of the information processing apparatus 101.

Figure 2:
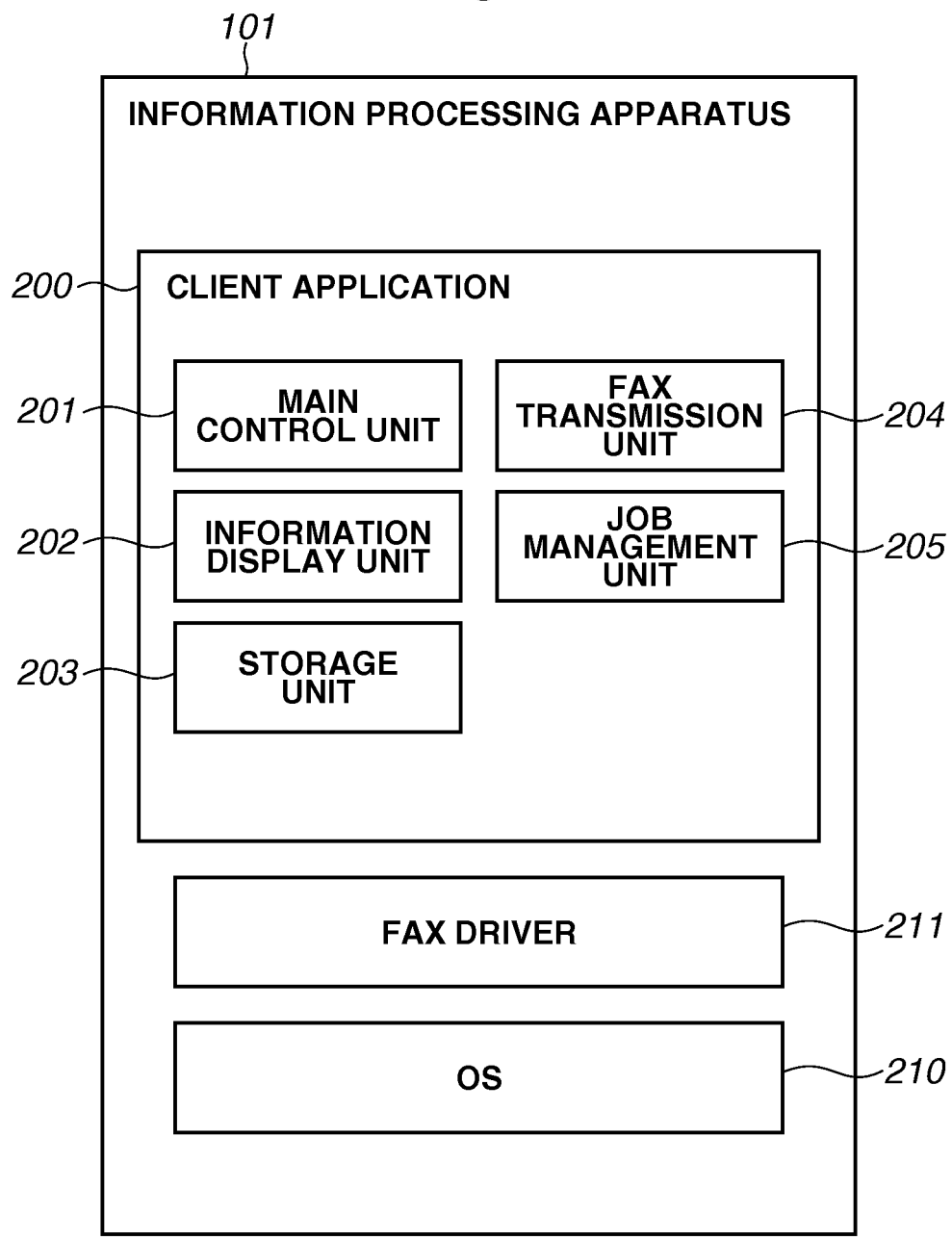
FIG. 2 illustrates a software configuration of an information processing apparatus.

Various units will be described in detail with reference to FIG. 1B. The CPU 102 executes various programs and realizes various functions according to the programs. The RAM 103 stores various kinds of information. In addition, the RAM 103 is used as a temporary work storage area by the CPU 102. The ROM 104 stores various programs and data. An external storage apparatus 108 is a nonvolatile storage apparatus to store various kinds of programs and data, and settings that need to be stored after the information processing apparatus 101 is restarted. The CPU 102 performs processing based on the programs stored in the external storage device 108, to realize the software configuration as illustrated in FIG. 2 and processing performed in each step in flowcharts described below.

The input/output interface 105 transmits data to a display connected to the information processing apparatus 101 and receives data from a pointing device.

The NIC 106 connects the information processing apparatus 101 to the network.

The above-described units are configured to be capable of exchanging data via the bus 107.

In addition, the image forming apparatus 111 includes a FAX unit (not illustrated) and can exchange data with each unit via a bus (not illustrated). The FAX unit can rasterize facsimile control language received from the information processing apparatus 101 into an image, and send forward the image to another facsimile apparatus or an IP-FAX via a public network (not illustrated) or the Internet. The image forming apparatus 111 also includes a printer unit (not illustrated) and a scanner unit (not illustrated). The printer unit can print raster images on a recording medium. The scanner unit can input images.

[Overall Software Configuration]

Next, a software configuration of the information processing apparatus 101 will be described with reference to FIG. 2. FIG. 2 illustrates the software configuration of the information processing apparatus 101.

A program for realizing functions of a client application 200 illustrated in FIG. 2 is stored, for example, in the ROM 104 in the information processing apparatus 101. Alternatively, all or part of the functions of the apparatus and the processing in the flowcharts described below can be realized by using a dedicated hardware module.

[Software Configuration of OS and FAX Driver)]

Next, an operating system (OS) 210 will be described. The OS 210 provides conventional and general OS functions (memory management, resource management, application management, etc.). A FAX driver 211 is one of the applications installed in the OS 210. The FAX driver 211 releases an interface (IF) for allowing the client application 200 to control functions of the FAX driver 211 as a Software Development Kit (SDK) for the FAX driver 211. Thus, the coordination operation with the client application 200 is ensured. For example, through the "coordination", the client application 200 and the FAX driver 211 exchange data and commands and perform processing by providing the respective functions to each other. The client application 200 can control the FAX driver 211 via the IF. The client application 200 can also use functions of the FAX driver 211 via the OS 210. The FAX driver 211 performs processing according to instructions from the client application 200 via the SDK or the OS 210. When receiving a FAX transmission instruction from the client application 200, the FAX driver 211 converts a document file specified by the output instruction into a FAX transmission data format (for example, raster data) interpretable by the image forming apparatus 111, and transmits the converted data to the image forming apparatus 111 via the network.

[Software Configuration of Client Application]

Next, the software configuration of the client application 200 will be described in detail with reference to FIG. 2. The client application 200 includes various modules such as a main control unit 201, an information display unit 202, a storage unit 203, a FAX transmission unit 204, and a job management unit 205.

The main control unit 201 controls the client application 200 to give instructions to and manages each module unit described below. The information display unit 202 provides a user with a UI of the client application 200 according to an instruction from the main control unit 201. The storage unit 203 stores and manages various data relating to the client application 200. The FAX transmission unit 204 instructs the FAX driver 211 to perform FAX transmission. The job management unit 205 acquires image files of FAX transmission images stored in the FAX driver 211 and bibliographic information. In addition, the job management unit 205 acquires statuses of FAX transmission jobs of the image forming apparatus 111.

Figure 3A:
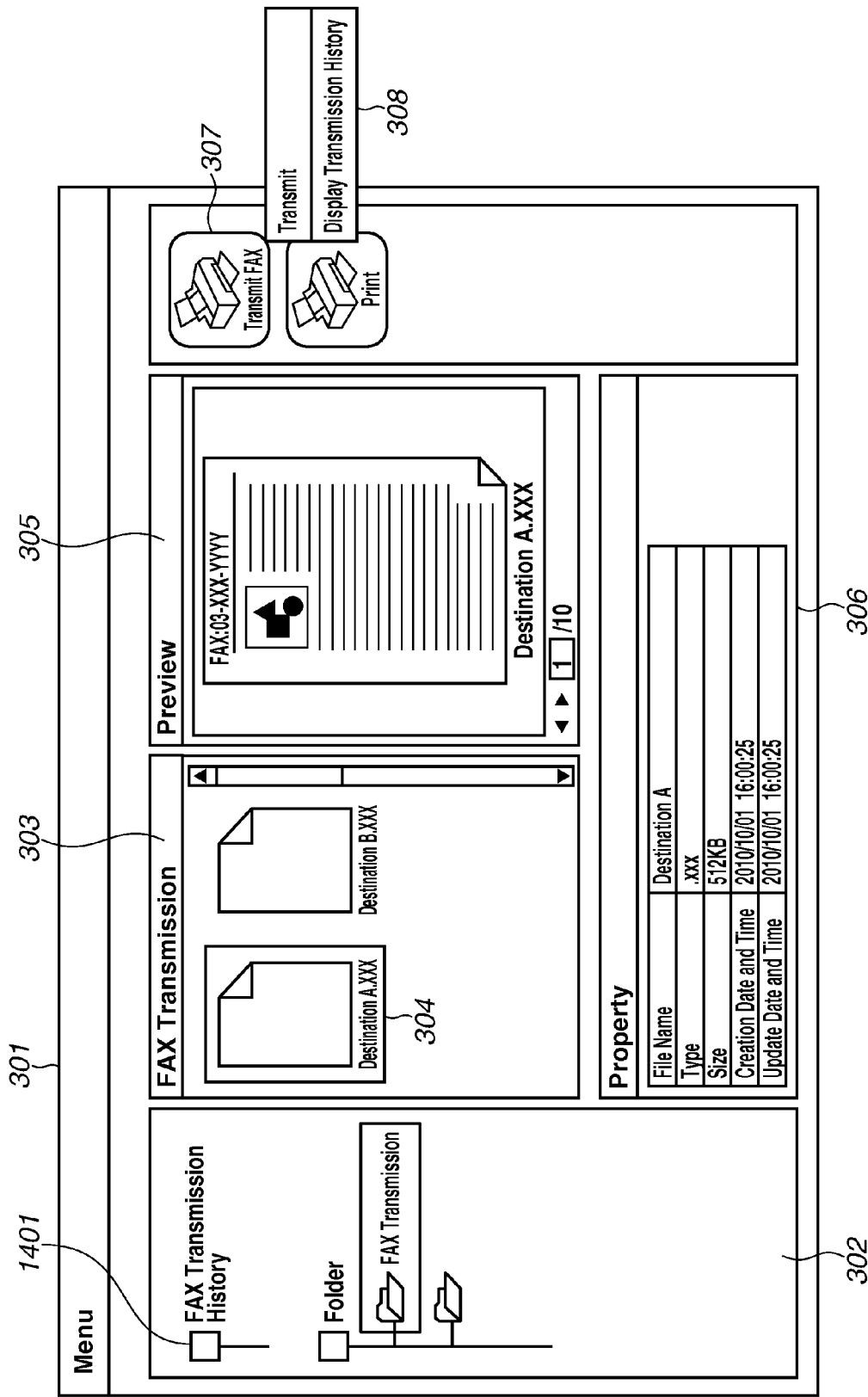
FIGS. 3A and 3B illustrate a main user interface (UI).
Figure 3B:
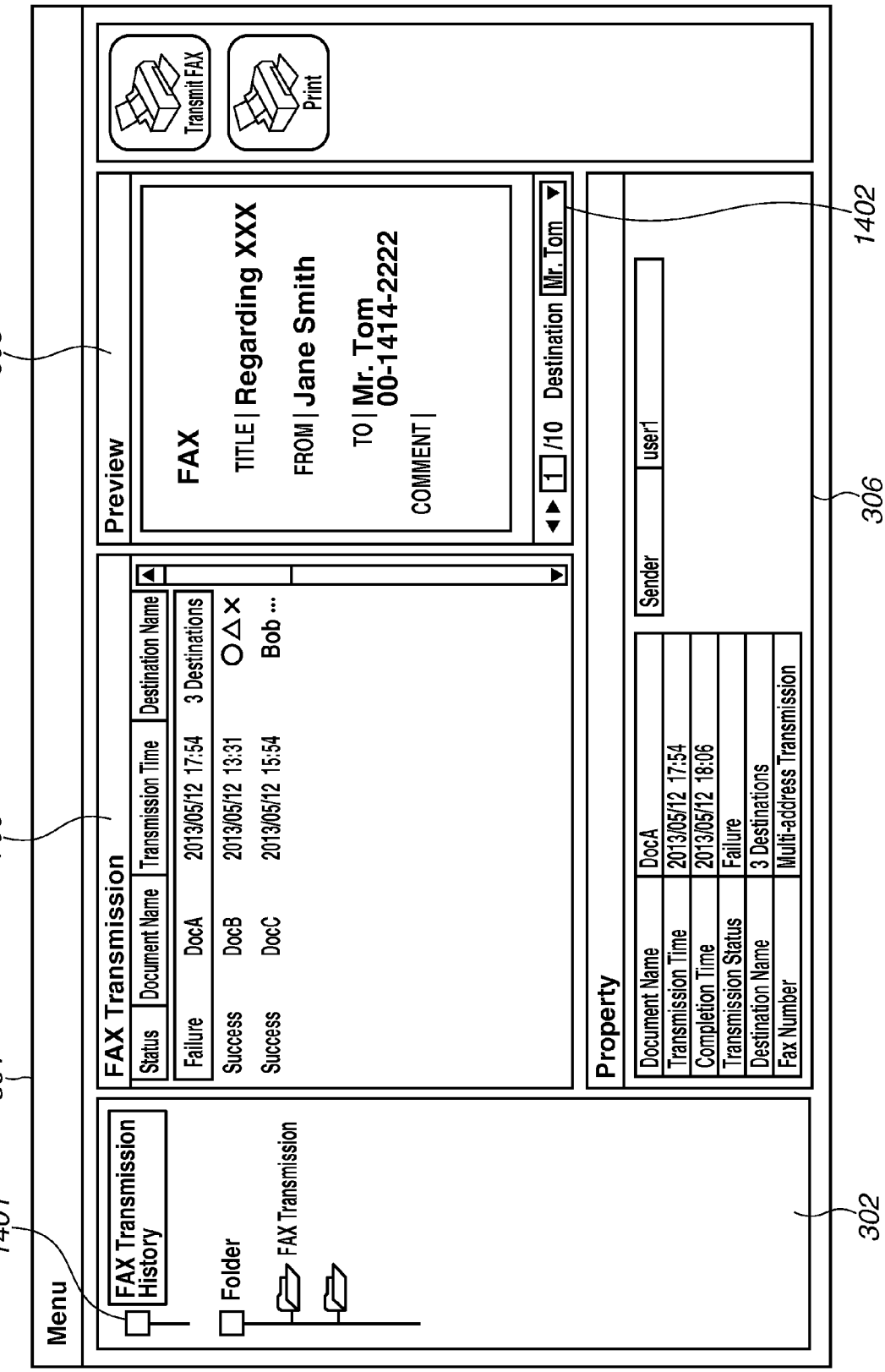

FIGS. 3A and 3B illustrate the UI of the client application 200 according to the present exemplary embodiment. First, the UI will be described with reference to FIG. 3A.

A main UI 301 includes a folder tree view 302 in which files are managed in a folder hierarchy and a file view 303 in which the files in a folder are displayed. In FIG. 3A, the folder tree view 302 includes a FAX transmission folder that is being selected by the user. Files in this currently-selected folder are displayed in the file view 303. As displayed in the file view 303, the FAX transmission folder includes files indicated by "Destination A.xxx" and "Destination B.xxx". A file 304 is being selected in the file view 303, and a preview of the selected file 304 can be displayed in a preview 305. A file property 306 is a file property to display information about the selected file 304. The client application 200 manages the information displayed in the file property 306. The information about the file 304 includes a file name, a file type, a file size, a file creation date and time, and a file update date and time.

A "Transmit FAX" button 307 is one of the functions of the client application 200. If the user selects a file and presses the "Transmit FAX" button 307, FAX transmission processing can be performed. Alternatively, FAX transmission processing can be performed by dragging and dropping a file onto the "Transmit FAX" button 307. In FIG. 3A, since the file 304 is being selected, if the user presses the "Transmit FAX" button 307, the selected file 304 is transmitted. If the user sets a mouse cursor on the "Transmit FAX" button 307, a context menu 308 including available operations is displayed. In the present exemplary embodiment, the context menu 308 of the "Transmit FAX" button 307 includes "Transmit" and "Display Transmission History" as menu items. If the user presses the menu item "Display Transmission History", a transmission history summary 700 illustrated in FIG. 7A is displayed.

Figure 7A:
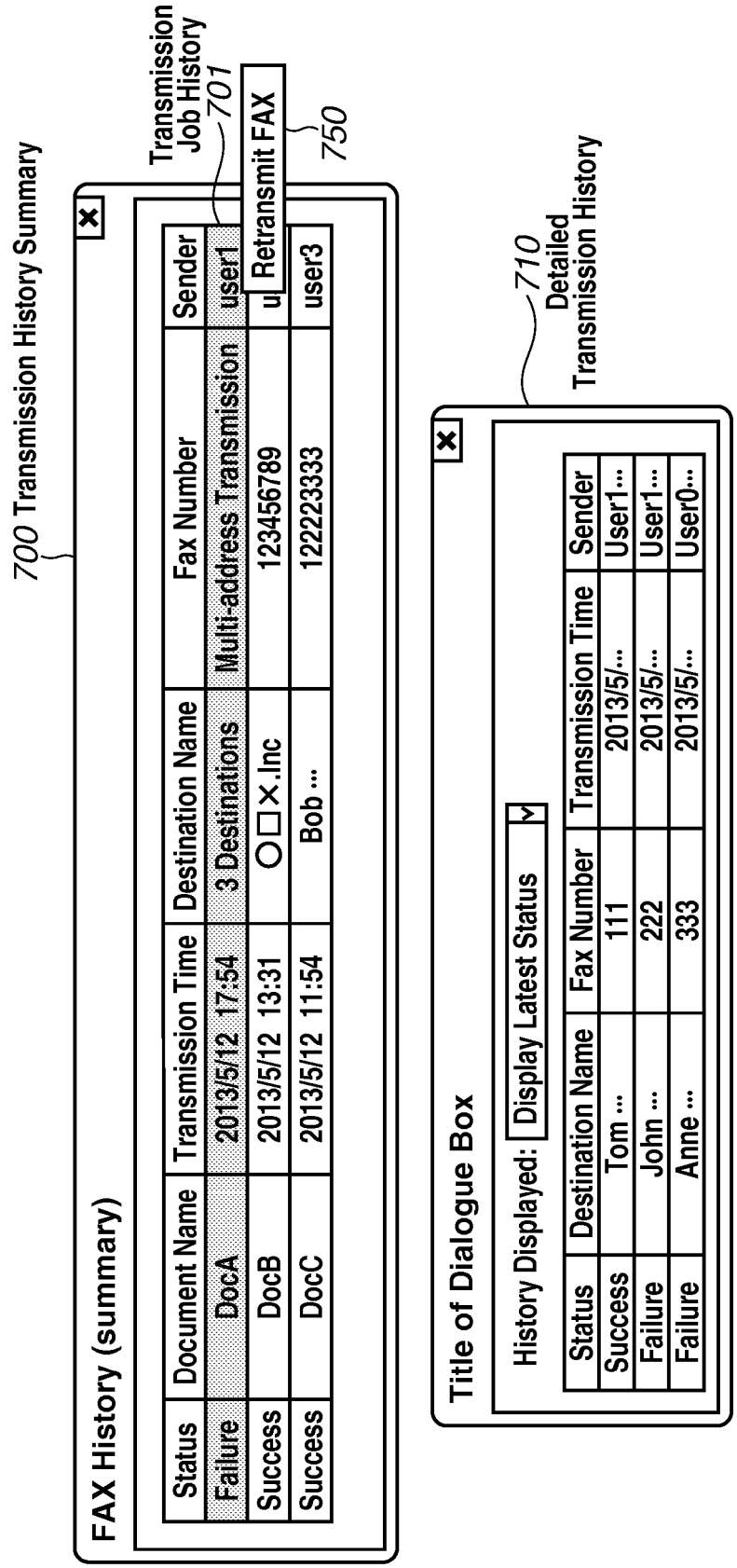

With the display configuration of the client application 200 in FIG. 3A, the transmission history summary 700 in FIG. 7A is displayed as a separate window. However, as illustrated in FIG. 3B, the transmission history summary 700 may be displayed within the same window. Alternatively, the file view 303 and the transmission history summary 700 may be displayed in the same area by using tabs. In this way, the file view 303 and the transmission history summary 700 are switched by switching the tabs.

Similar to the main UI 301 of the client application illustrated in FIG. 3A, a main UI 301 in FIG. 3B includes a folder tree view 302 in which files are managed in a folder hierarchy and the transmission history summary 700. If the user selects a FAX transmission history 1401 in the folder tree view 302, the main UI 301 in FIG. 3B displays the transmission history summary 700 instead of the file view 303. The main UI 301 in FIG. 3B also includes a preview 305 displaying a preview of the selected file 304 and a file property 306 displaying details of the selected file 304.

Contents that can be displayed and operated on the main UI 301 in FIG. 3B will be described in detail. The same contents as those in the transmission history summary 700 illustrated in FIG. 7A are displayed in the transmission history summary 700 in FIG. 3B. In the preview 305, a transmission image in the selected FAX transmission history in the file view 303 is displayed. This transmission image is displayed by referring to transmission image information 508 in a FAX transmission history 501. The preview 305 includes a destination selection 1402. If a fax is transmitted to a plurality of destinations, the user can select one of the destinations from the destination selection 1402 and a corresponding image can be displayed in the preview 305. The destination selection 1402 has a list of destinations included in the selected FAX transmission history in the file view 303. The user can select one of the destinations on the list. A transmission image transmitted to the destination selected in the destination selection 1402 is displayed in the preview 305. The file property 306 displays detailed information about the FAX transmission history selected in the file view 303. For example, the file property 306 displays a document name, a transmission time, a completion time, a transmission status, a destination name, a destination FAX number, and a sender.

Figure 4:
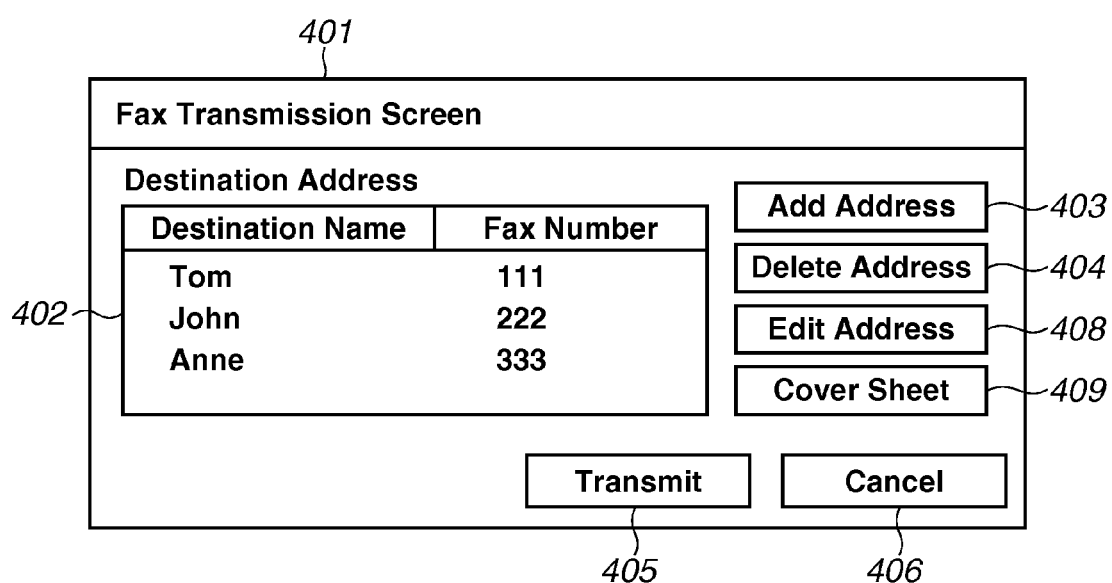
FIG. 4 illustrates a FAX transmission setting UI.

FIG. 4 illustrates a FAX transmission UI 401 of the client application 200. The FAX transmission UI 401 is displayed by either dropping a file on the "Transmit FAX" button 307 or selecting "Transmit" in the context menu 308. The FAX transmission UI 401 is also displayed in a FAX transmission processing flow, which will be described below.

The FAX transmission UI 401 includes a destination address 402. The destination address 402 is information used as setting values when FAX transmission is performed. In the destination address 402, at least one destination FAX number and at least one destination name are displayed. While not illustrated in the present exemplary embodiment, other information such as a FAX line type may additionally be displayed. If multi-address transmission for transmitting a single file to a plurality of destinations is performed, information about a plurality of addresses can be displayed. An "Add Address" button 403 is a button for adding a new FAX destination address to the destination address 402. If the user presses the "Add Address" button 403, an address addition screen (not illustrated) is displayed, and the user can input destination address information to be added to the destination address 402.

A "Delete Address" button 404 is a button for deleting an address included in the destination address 402. By pressing the "Delete Address" button 404, the user can delete the destination address information being selected in the destination address 402. A "Transmit FAX" button 405 is a button for performing FAX transmission to the destination included in the destination address 402. By pressing the "Transmit FAX" button 405, the user can give a FAX transmission instruction. The client application 200 transmits the FAX transmission instruction to the FAX driver 211 via the OS 210. A "Cancel" button 406 is a button for cancelling FAX transmission. If the user presses the "Cancel" button 406, the FAX transmission UI 401 is closed. An "Edit Address" button 408 is a button for editing an address included in the destination address 402. If the user presses the "Edit Address" button 408, an address edit screen (not illustrated) is displayed, and the user can edit the destination address information being selected in the destination address 402.

[Data Structure of FAX Transmission History Data 500]

Figure 5:
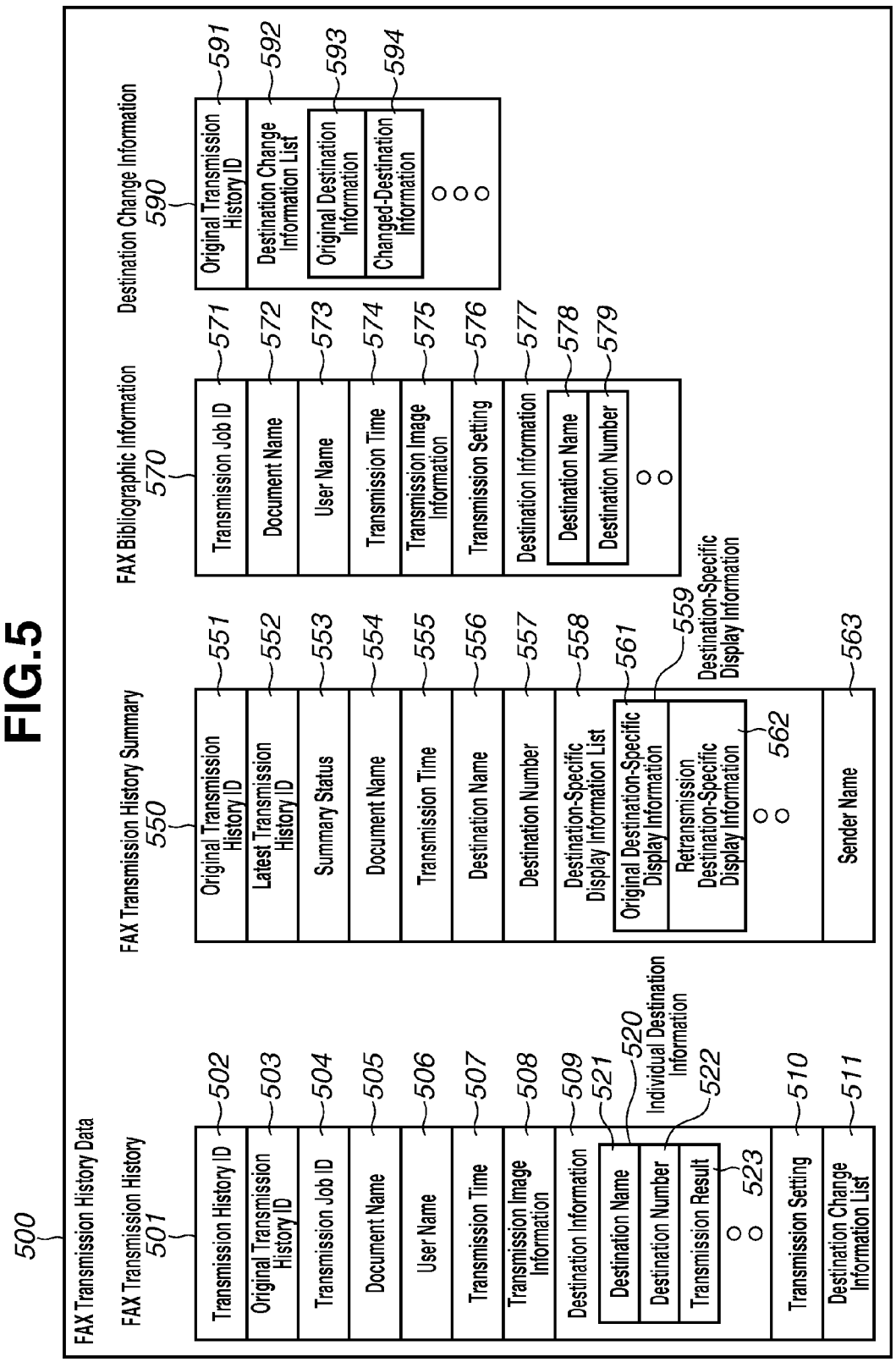
FIG. 5 illustrates FAX transmission history data.

FIG. 5 is a schematic diagram illustrating an example of FAX transmission history data. The FAX transmission history data 500 includes at least one FAX transmission history 501, at least one FAX transmission history summary 550, at least one item of FAX bibliographic information 570, and at least one item of destination change information 590. The FAX transmission history data 500 is stored as a file in the information processing apparatus 101 or the data management server 110.

Alternatively, the client application 200 may be configured to store and manage FAX transmission images, which are obtained when FAX transmission is performed by using the FAX driver 211, and transmission setting information in the data management server 110 as transmission histories.

The FAX transmission history 501 stores FAX transmission contents and results. A transmission history ID 502 is an ID that is uniquely given to each FAX transmission performed by a user. In other words, a transmission history ID 502 identifies a FAX transmission history. The transmission history ID 502 is an identifier represented by at least one number and/or character. An original transmission history ID 503 stores a retransmission-source transmission history ID.

Hereinafter, expressions "retransmission-source" and "when transmitted" will be described. In the present exemplary embodiment, if, for example, an expression "retransmission-source A" is used, the expression means "A corresponding to a FAX job used as a source of retransmission" (a FAX job that has failed FAX transmission once (hereinafter, a FAX job will simply be referred to as "a job")). In other words, "a retransmission-source transmission history ID" means a transmission history ID corresponding to a job used as a source of retransmission. In contrast, if, for example, an expression "B when retransmitted" is used, the expression means "B corresponding to a retransmitted job.

A transmission job ID 504 is notified from the FAX driver 211. In addition, the transmission job ID 504 is an ID for associating FAX bibliographic information 570 created by the FAX driver 211 with the FAX transmission history 501 when the FAX transmission is performed. A document name 505 is a name of a document used in the FAX transmission. A user name 506 is a name of a sender who has performed the FAX transmission. A transmission time 507 is date and time of the FAX transmission. The transmission image information 508 is information for referring to a FAX image that has been transmitted. More specifically, the transmission image information 508 stores at least a reference file path to the FAX image file that has been transmitted. Destination information 509 includes at least one set of items of individual destination information 520. One set of items of individual destination information 520 includes a destination name 521, a destination number 522, and a transmission result 523 of a transmission destination. If a FAX has been transmitted to a plurality of destinations, the destination name 521, the destination number 522, and the transmission result 523 are stored for each of the destinations. The destination name 521 is a FAX destination name, the destination number 522 is a FAX destination number, and the transmission result 523 is a result of FAX transmission to the destination. For example, "Success" or "Failure" is represented as the FAX transmission result. A setting that has been used in the FAX transmission is stored in a transmission setting 510. For example, "With Cover Sheet" or "Without Cover Sheet" is represented as a setting stored in transmission setting 510.

The FAX transmission history summary 550 stores aggregated contents of FAX transmission histories having the same original transmission history ID. More specifically, the FAX transmission history summary 550 stores aggregated contents of a FAX transmission history created by retransmission and a transmission history used for the retransmission. This data is used for displaying the transmission history summary 700 illustrated in FIG. 3B and FIG. 7A. Since the FAX transmission history summary 550 can be created from the FAX transmission history 501 and the destination change information 590, all or part of the data may be stored as a file. The data may be stored in the RAM. An original transmission history ID 551 stores a retransmission-source transmission history ID. A latest transmission history ID 552 stores a transmission history ID in a FAX transmission history created when the latest FAX transmission is performed by using a FAX transmission history created by retransmission. A summary status 553 is an aggregated transmission result of the FAX transmission history created by retransmission and the transmission history used for retransmission. A document name 554 is the same as the document name 505. A transmission time 555 is date and time at which the latest FAX transmission is performed by using the FAX transmission history when retransmitted. A destination name 556 is a name of the FAX destination to which FAX transmission is performed by using the FAX transmission history when retransmitted. If there is a plurality of destinations, the destination name 556 stores information indicating that there is a plurality of destinations. For example, if there are three destinations, information indicating "3 Destinations" is stored. A destination number 557 is a FAX number of the FAX destination. If there is a plurality of destinations, the destination number 557 stores information indicating that there is a plurality of FAX numbers. For example, information indicating "Multi-Address Transmission" is stored. A destination-specific display information list 558 includes at least one set of destination-specific display information 559. One set of the destination-specific display information 559 includes original destination-specific display information 561, which is about the destination and display of the first transmission, and retransmission destination-specific display information 562, which is about the destination and display of at least one retransmission. The original destination-specific display information 561 and the retransmission destination-specific display information 562 each stores at least information about a destination name, a destination number, and a transmission result. In addition to the above information, a transmission time, a transmission user name, and the like may be stored. A sender name 563 is a name of a user of the information processing apparatus 101 that has performed the FAX transmission.

The FAX bibliographic information 570 is created by the FAX driver 211 when a FAX is transmitted and is about transmission contents of the FAX. A transmission job ID 571 is an ID for identifying a FAX transmission job. If the client application 200 notifies the FAX driver 211 of a transmission job ID, the FAX driver 211 stores the notified ID. Otherwise, the FAX driver 211 creates and stores a transmission job ID. A document name 572 is a name of a document that has been used for the FAX transmission. A user name 573 is a name of a sender who has transmitted the FAX. A transmission time 574 is date and time of the FAX transmission. Transmission image information 575 is information for referring to a FAX image that has been transmitted. More specifically, the transmission image information 575 stores, at least, a reference file path to a FAX image file that has been transmitted. A transmission setting 576 stores a setting that has been used for the FAX transmission. For example, "With Cover Sheet" or "Without Cover Sheet" is stored in the transmission setting 576 as a setting. Destination information 577 stores a set of a destination name 578 and a destination number 579 to which the FAX has been transmitted.

If a FAX is retransmitted after an original destination is changed, information about the original destination and the changed destination is stored in the destination change information 590. An original transmission history ID 591 stores a retransmission-source transmission history ID. A destination change information list 592 stores at least one set of original destination information 593 and changed-destination information 594. The original destination information 593 stores the retransmission-source individual destination information 520. The changed-destination information 594 stores the individual destination information 520 in a FAX transmission history 501 when retransmitted.

[FAX Transmission Flow]

FAX transmission processing performed by the client application 200 in the information processing apparatus 101 will be described with reference to FIGS. 6A and 6B.

FIG. 6A is a flowchart example illustrating processing in which the client application 200 performs FAX transmission, acquires a FAX transmission image, FAX bibliographic information created by the FAX driver 211, and a result of transmission performed by the image forming apparatus 111, and stores the acquired information as a FAX transmission history. The client application 200 starts the FAX transmission processing when a user performs a FAX transmission operation, for example, by selecting a file in the file view 303 and pressing the "Transmit FAX" button 307 as described above.

First, a user gives an instruction for transmitting a file being selected in the file view 303, and the client application 200 receives the transmission instruction. In step S601, the main control unit 201 in the client application 200 transmits FAX information to the FAX driver 211 via the FAX transmission unit 204 as a FAX transmission instruction. This FAX information includes the file being selected in the file view 303 and the transmission setting specified in the FAX transmission UI 401, and is instruction information for instructing the image forming apparatus 111 to transmit a FAX. The main control unit 201 acquires the information about the file being selected in the file view 303 and the transmission setting specified in the FAX transmission UI 401 by giving an instruction to the information display unit 202.

In step S602, the FAX driver 211 receives the FAX transmission instruction from the client application 200. In step S603, based on the received FAX information, the FAX driver 211 creates FAX transmission instruction information for causing the image forming apparatus 111 to perform FAX transmission. More specifically, the FAX driver 211 creates the FAX transmission instruction information by converting a specified FAX transmission target file into data such as raster data that can be processed by the image forming apparatus 111 and by using the specified transmission setting as a transmission instruction that can be interpreted/performed by the image forming apparatus 111. In step S604, the FAX driver 211 transmits the FAX transmission instruction information created in step S603 to the image forming apparatus 111 via the network. In step S605, the FAX driver 211 stores the FAX transmission image transmitted to the image forming apparatus 111. More specifically, the FAX driver 211 stores the converted image data as a file in a general image storage format such as in Tagged Image File Format (TIFF). In addition, the FAX driver 211 stores the FAX transmission instruction information as the FAX bibliographic information 570. The FAX driver 211 stores the FAX bibliographic information 570 in a general structured text file format such as in Extensible Markup Language (XML).

In step S606, the image forming apparatus 111 receives the FAX transmission instruction information. In step S607, the image forming apparatus 111 performs FAX transmission by sending forward a FAX based on the received FAX transmission instruction information to another facsimile apparatus or an IP-FAX via a public line or the Internet.

In step S608, the client application 200 detects the storage of the FAX transmission image by the FAX driver 211. The client application 200 detects the storage of the FAX transmission image when the job management unit 205 is notified of completion of storage of the FAX transmission image by the FAX driver 211. Alternatively, the job management unit 205 may monitor generation of a file in which the FAX transmission image is stored by the FAX driver 211. When detecting the storage of the FAX transmission image, the job management unit 205 notifies the main control unit 201 of the detection. In step S609, the main control unit 201 in the client application 200 acquires the FAX transmission image and the FAX bibliographic information detected in step S608. More specifically, the main control unit 201 copies the files of the FAX transmission image and the FAX bibliographic information 570 to predetermined areas managed by the client application 200, reads the FAX bibliographic information 570, creates a FAX transmission history 501, and instructs the storage unit 203 to store the FAX transmission history 501. The FAX transmission history 501 is stored in the information processing apparatus 101 and/or the data management server 110. If the FAX transmission history 501 is stored in the data management server 110, a plurality of users can share the FAX transmission history, which allows the users to browse the FAX transmission history or to perform retransmission based on the FAX transmission history. In step S610, the main control unit 201 in the client application 200 refers to a transmission job ID defined in the FAX bibliographic information read in step S609. The transmission job ID can uniquely identify the transmission instruction (transmission job) performed by the FAX driver 211. By inquiring the image forming apparatus 111 with the transmission job ID as a key, the main control unit 201 can acquire information about a transmission job matching the transmission job ID. In step S611, the main control unit 201 in the client application 200 instructs the job management unit 205 to specify the transmission job ID referred to in step S610, and transmit a transmission job status acquisition request to the image forming apparatus 111.

In step S612, the image forming apparatus 111 receives the transmission job status acquisition request from the client application 200. In step S613, the image forming apparatus 111 checks a status of the FAX transmission job corresponding to the specified transmission job ID. For example, the status of the FAX transmission job represents the state in which the image data is being rasterized or a destination is being called, or the completed state in which the job is completed successfully or unsuccessfully. The image forming apparatus 111 checks the status of the transmission job by referring to a processing status in a memory in the image forming apparatus 111 or to FAX transmission log information stored in a hard disk drive (HDD). In step S614, the image forming apparatus 111 transmits the transmission job status checked in step S613 to the information processing apparatus 101, which has transmitted the request.

In step S615, the job management unit 205 in the client application 200 in the information processing apparatus 101 receives the response about the job status from the image forming apparatus 111 and notifies the main control unit 201 of the job status. In step S616, the main control unit 201 checks the received job status and determines whether the job has been completed. If the job is still being processed (NO in step S616), the operation returns to step S611 after a predetermined time. In step S611, the client application 200 transmits the transmission job status acquisition request to the image forming apparatus 111 again. In step S616, if the main control unit 201 determines that the job is already completed (YES in step S616), the operation proceeds to step S617. In step S617, the main control unit 201 in the client application 200 instructs the storage unit 203 to store this status representing completion as a transmission result in the FAX transmission history 501.

Figure 6B:
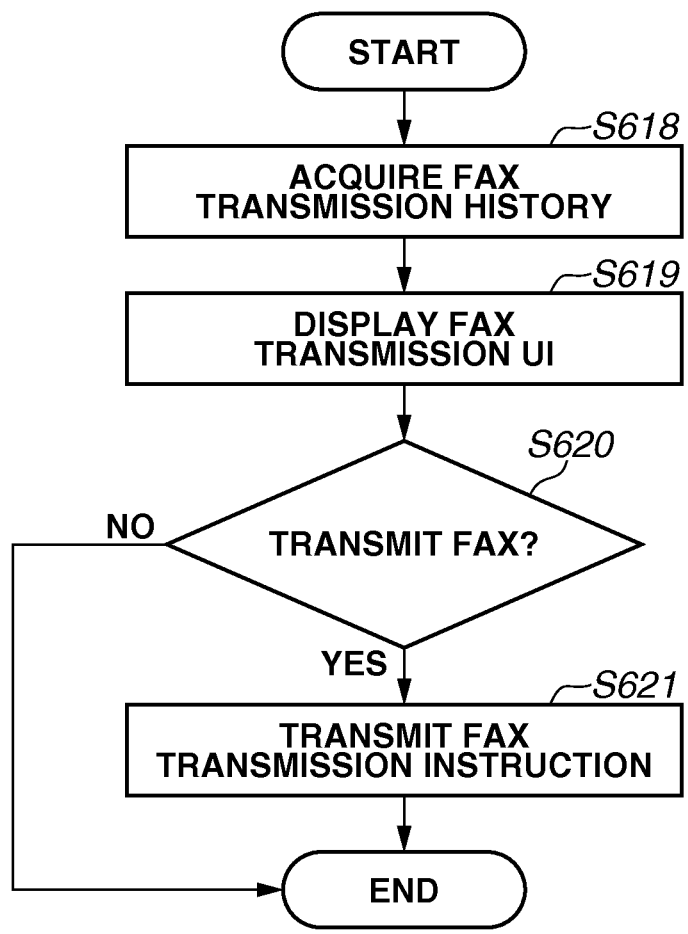

FIG. 6B is an example of a flowchart illustrating processing in which the client application 200 performs retransmission by using a FAX transmission history. The processing starts when a user selects a retransmission target transmission history in the transmission history summary 700 in the client application 200 and presses the "Retransmit FAX" button 750.

In step S618, the main control unit 201 in the client application 200 receives a retransmission instruction from a user and acquires a FAX transmission history 501 in the selected state on the transmission history summary 700. More specifically, the main control unit 201 refers to the FAX transmission history 501 via the storage unit 203 and acquires the corresponding transmission image information 508 and transmission setting 510. Next, in step S619, the main control unit 201 instructs the information display unit 202 to display the FAX transmission UI 401. In this step, the main control unit 201 causes the information display unit 202 to display the FAX transmission UI 401 by specifying the transmission setting 510 acquired in step S618. In this way, the FAX transmission UI 401 can be displayed with the previous transmission setting. In step S620, the main control unit 201 determines whether the user presses the "Transmit" button in the FAX transmission UI 401 (YES in step S620). If the main control unit 201 determines that the user presses the "Transmit" button (YES in step S620), the operation proceeds to step S621. In step S621, the main control unit 201 instructs the FAX transmission unit 204 to transmit a FAX transmission instruction including the transmission image specified in the transmission image information 508 as a transmission target and the setting specified in the FAX transmission UI 401 as a transmission setting to the FAX driver 211. If the user presses the "Cancel" button to cancel the FAX transmission (NO in step S620), the operation is ended. In step S621, the main control unit 201 specifies a transmission job ID created and managed by the client application 200 and gives the FAX transmission instruction. In addition, the main control unit 201 associates the transmission job ID with a FAX transmission history corresponding to the retransmitted Fax, and stores the associated information. The transmission job ID is referred to when a FAX transmission history for the retransmitted FAX is created (S608). In addition, if the transmission job ID is the same as the transmission job ID 571 in the FAX bibliographic information 570 created at the retransmission, the FAX transmission history created at the retransmission and the retransmission-source FAX transmission history are associated with each other. More specifically, if the transmission job IDs are the same, the FAX transmission history created at the retransmission and the source FAX transmission history are associated with each other by setting the transmission history ID 502 in the retransmission-source FAX transmission history as the original transmission history ID 503 at the retransmission.

[Display Examples of FAX Transmission History]

FIG. 7A illustrates a UI displaying FAX transmission histories based on the FAX transmission history data 500. FIG. 7B illustrates an example of FAX transmission history data for displaying FIG. 7A. FIG. 7B illustrates only some of the FAX transmission history data illustrated in FIG. 5.

The transmission history summary 700 is displayed if the user presses the menu item "Display Transmission History" in the context menu 308. A transmission job history 701 displays contents and a status of a FAX transmission per user's transmission instruction. For example, when a multi-address transmission is performed, it is displayed as a single transmission job history. In FIG. 7A, the transmission history summary 700 displays "Status" (transmission status), "Document Name", "Transmission Date and Time", "Destination Name", "FAX Number", and "Sender". The transmission job history 701 is displayed based on a FAX transmission history summary 720, which will simply be referred to as "transmission summary 720" as needed. Each status in the transmission history summary 700 is displayed based on the summary status in a corresponding transmission summary 720. In the multi-address transmission, if any one of the transmission results includes "Failure" representing unsuccessful transmission, "Failure" is displayed in the status in the corresponding transmission job history. More specifically, in FIG. 7B, the transmission results of the FAX transmission to "John" and "Anne" represent "Failure", "Failure" is displayed in the status in the transmission job history 701 according to the transmission results.

A context menu 750 includes a menu item "Retransmit FAX". If the user presses this menu item "Retransmit FAX", FAX retransmission processing is performed by using the transmission job history 701.

A detailed transmission history 710 is an example of a UI displaying a transmission status and transmission contents corresponding to each destination included in a transmission job history selected in the transmission job history 701. On this screen, a latest transmission status and transmission contents corresponding to each destination are displayed. The detailed transmission history 710 is displayed based on the destination-specific display information list in the transmission summary 720. For example, in the detailed transmission history 710, the status of transmission to a destination name "Tom" is based on data 721, which is the destination-specific display information in the transmission summary 720 that includes a destination name "Tom". Since the transmission result in the data 721 represents "Success" indicating successful FAX transmission, "Success" is also displayed in the status corresponding to the destination name "Tom" in the detailed transmission history 710.

A FAX transmission history 740, which will simply be referred to as "transmission history 740" as needed, is an example of the FAX transmission history 501 created by FAX transmission. The transmission history 740 is source data of the transmission summary 720. Thus, "Success" is stored as the transmission result corresponding to the destination name "Tom" in the transmission history 740.

FIG. 8A illustrates an example of a UI displaying FAX transmission histories. This UI is displayed if the user selects the transmission job history 701 in FIG. 7A representing multi-address transmission and presses "Retransmit FAX" in the above context menu and if the retransmission is successfully completed. FIG. 8B illustrates an example of FAX transmission history data for displaying FIG. 8A. FIG. 8B illustrates only some of the FAX transmission history data illustrated in FIG. 5.

Since the FAX retransmission is completed, the contents displayed in the transmission job history 701 in the transmission history summary 700 in FIG. 7A are updated to those displayed in a transmission job history 801 in a history summary 800 in FIG. 8A. For example, the destination-specific display information list in a FAX transmission history summary 820, which will simply be referred to as "transmission summary 820" as needed, in FIG. 8B includes information representing the transmission results "Success" indicating that retransmission to both of the retransmission-target destinations, i.e., the destination names "John" and "Anne", has succeeded. As a result of the retransmission, the transmission results for all the destinations included in the transmission job history 801 finally represent "Success". Thus, "Failure" in the status in the transmission job history 701 has been updated to "Success" in the status in the transmission job history 801.

A detailed transmission history 810 displays a transmission status and transmission contents corresponding to each destination included in the transmission job history 801. Information displayed on the detailed transmission history 810 has also been updated by the retransmission. For example, since the retransmission to the destination names "John" and "Anne" in FIG. 8A has succeeded, the statuses have been updated from "Failure" to "Success", and the latest status corresponding to each destination is displayed.

A history selection control item 811 is a control item for switching the contents to be displayed as the detailed transmission history. The latest statuses updated by the retransmission are displayed in the detailed transmission history 810. By operating the history selection control item 811, the detailed transmission history 810 is switched to a detailed transmission history 812 in which all histories including past histories are displayed per transmission destination.

A FAX transmission history 840, which will simply be referred to as "transmission history 840 as needed, is a retransmission-source FAX transmission history and has a transmission job ID "UID1". A FAX transmission history 860, which will simply be referred to as "transmission history 860" as needed, is a transmission history created by the retransmission. FAX bibliographic information 880 is an example of the FAX bibliographic information 570. The transmission history 860 is created based on the FAX bibliographic information 880. Based on the transmission job ID "UID1" in the FAX bibliographic information 880, the retransmission-source transmission history 840 having the transmission job ID "UID1" is determined, and a transmission history ID "A" in the retransmission-source transmission history 840 is given as the original transmission history ID in the transmission history 860.

Figure 9:
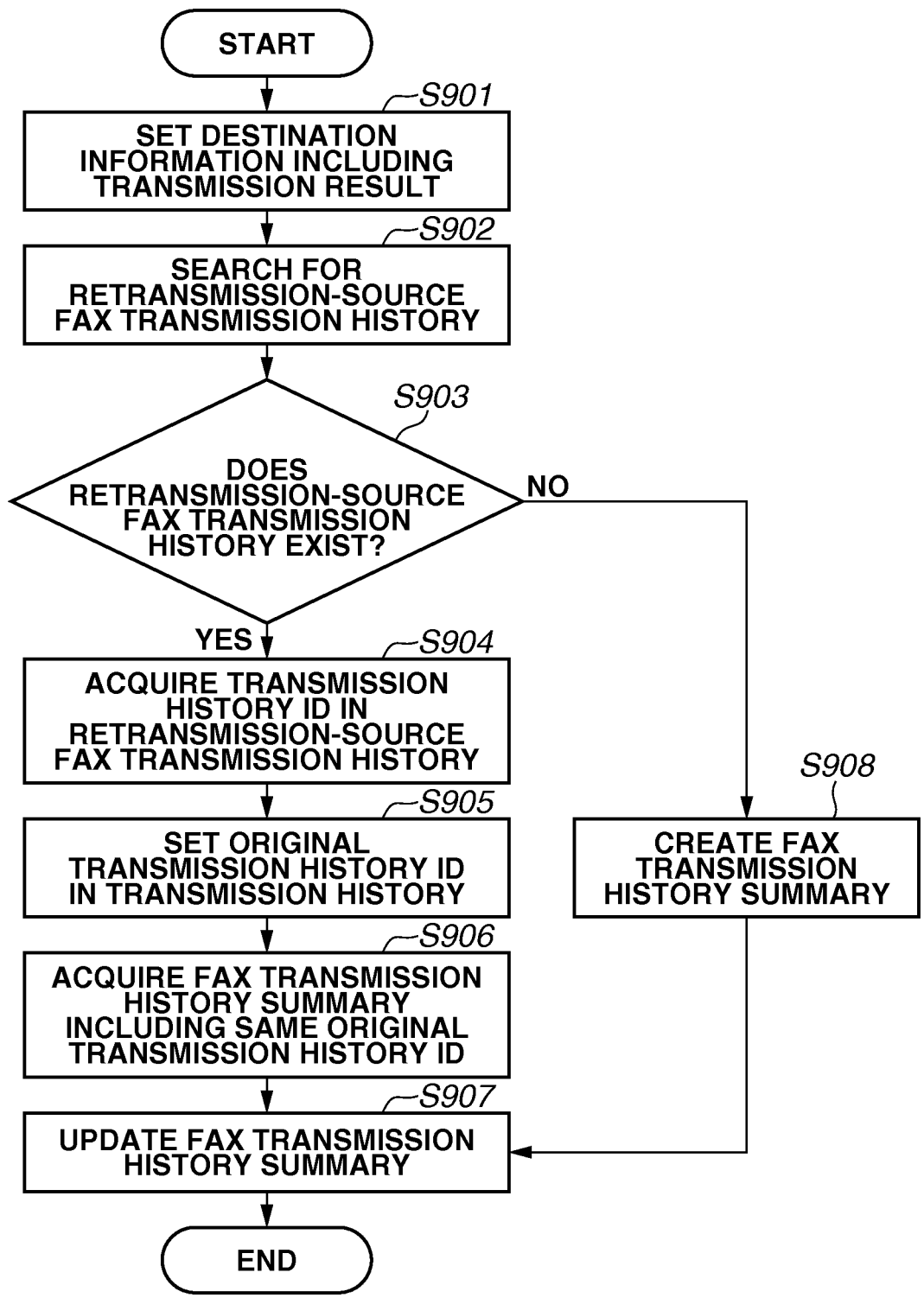
FIG. 9 is a flowchart illustrating processing for updating the FAX transmission history data performed after the retransmission.
Figure 10:
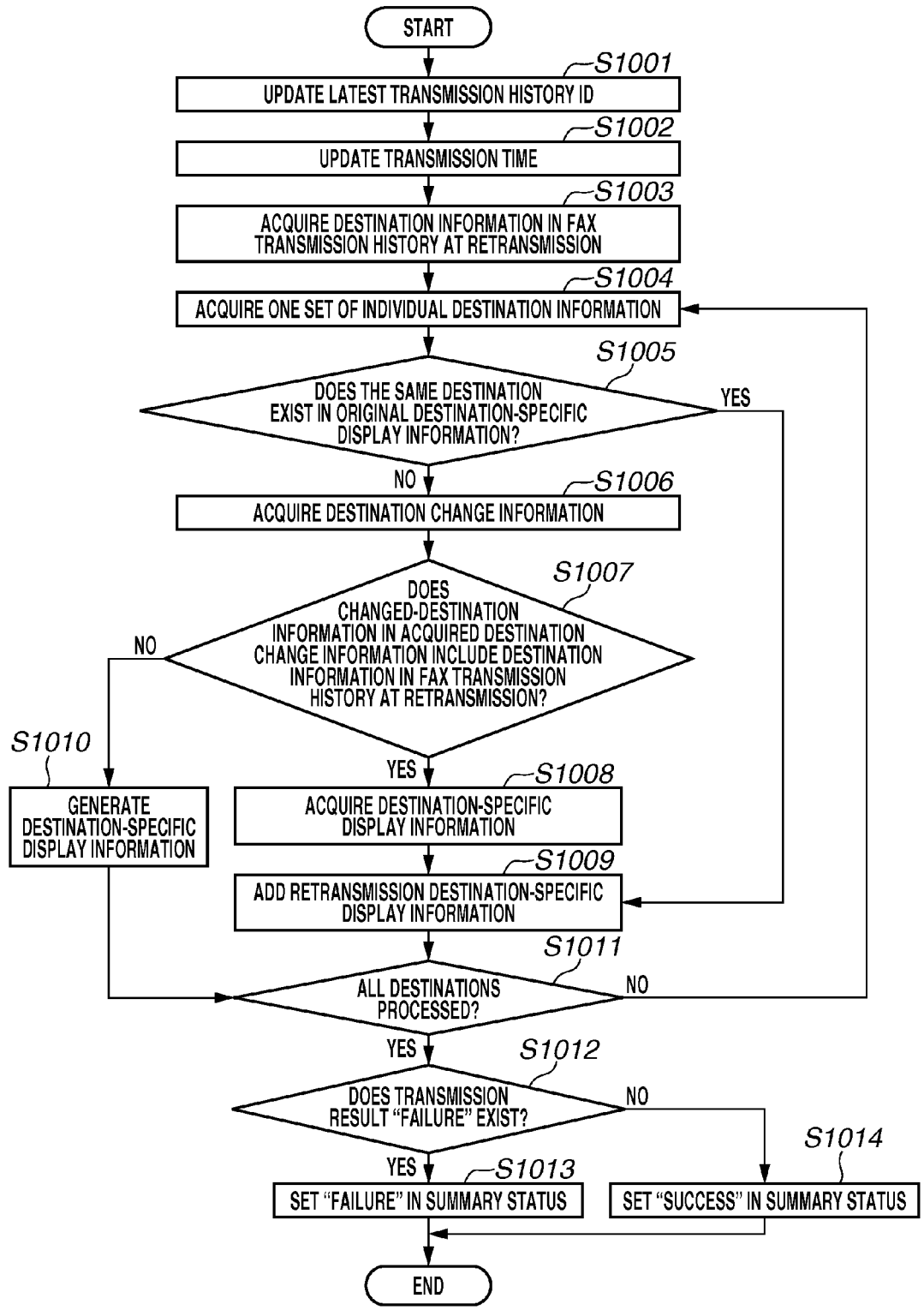
FIG. 10 is a flowchart illustrating processing for updating a FAX transmission history summary included in the FAX transmission history data performed after the retransmission.

The transmission summary 820, the transmission history 840, and the FAX transmission history 860 are created or updated by applying a data update flow in FIGS. 9 and 10 performed after retransmission.

[Flows for Updating FAX Transmission History Displays]

A flow for details of the transmission history information update processing and UI update processing in step S617 in FIG. 6A will be described with reference to FIGS. 5, 9, and 10.

FIG. 9 is a flowchart illustrating details of the transmission history information update processing and UI update processing in step S617. In the following description, a FAX transmission history 501 created by normal FAX transmission, not by retransmission, is simply referred to as a "FAX transmission history", and a retransmission-source FAX transmission history 501 that already exists is referred to as a "retransmission-source FAX transmission history".

In step S901, the main control unit 201 refers to the FAX bibliographic information 570 acquired in step S609 in FIG. 6A and the job status received in step S615 in FIG. 6A and sets the destination name 521, the destination number 522, and the transmission result 523 in the individual destination information 520 in the destination information 509. Next, in step S902, the main control unit 201 refers to the transmission job ID 571 and searches a plurality of transmission job IDs 504 in the respective FAX transmission histories 501 that have been accumulated for a retransmission-source FAX transmission history including the same ID as the transmission job ID 571. Next, in step S903, the main control unit 201 determines whether the retransmission-source FAX transmission history exists. In step S903, if such history exists (YES in step S903), the operation proceeds to step S904. If not (NO in step S903), the operation proceeds to step S908. In step S904, the main control unit 201 acquires the transmission history ID 502 in the retransmission-source FAX transmission history 501. In step S905, the main control unit 201 sets the transmission history ID 502 in the retransmission-source FAX transmission history 501 acquired in step S904 in the original transmission history ID in the FAX transmission history. In step S906, the main control unit 201 acquires a FAX transmission history summary 550 including the original transmission history ID 551 that matches the transmission history ID 502 in the retransmission-source FAX transmission history. Next, in step S907, the main control unit 201 updates the FAX transmission history summary 550 acquired in step S906. This processing will be described in detail with reference to FIG. 10. In step S908, the main control unit 201 creates a new FAX transmission history summary and sets a value corresponding to the transmission history ID 502 of the FAX transmission history in the original transmission history ID 551. In addition, the main control unit 201 sets a value corresponding to the document name 505 of the FAX transmission history in the document name 554.

FIG. 10 is a flowchart illustrating details of the processing in step S907 in FIG. 9. The main control unit 201 performs entire processing in this processing flow. In step S1001, the main control unit 201 sets the value corresponding to the FAX transmission history ID 502 of the FAX transmission history in the latest transmission history ID 552. In step S1002, the main control unit 201 sets a value corresponding to transmission time 507 of the FAX transmission history in the transmission time 555. In step S1003, the main control unit 201 acquires the destination information 509 in the FAX transmission history at the retransmission. Next, in step S1004, the main control unit 201 acquires one set of individual destination information 520 from the destination information 509 acquired in step S1003.

In step S1005, the main control unit 201 respectively compares the destination name 521 and the destination number 522 in the acquired individual destination information 520 with the destination names and the destination numbers in the original destination-specific display information 561, to determine whether the same destination information exists. If the same destination information exists (YES in step S1005), the operation proceeds to step S1009. If not (NO in step S1005), the operation proceeds to S1006. In step S1006, the main control unit 201 acquires destination change information 590 including the original transmission history ID 591 that matches the original transmission history ID 551 at the retransmission. In step S1007, the main control unit 201 refers to the destination change information list 592 in the destination change information 590 acquired in step S1006, and determines whether the changed-destination information 594 includes the same destination name and the same destination number as the destination name 521 and the destination number 522 in the individual destination information 520 in the transmission history 501 at the retransmission. If the changed-destination information 594 includes thereof (YES in step S1007), the operation proceeds to S1008. If not (NO in step S1007), the operation proceeds to S1010. In step S1008, from the destination names and the destination numbers in the original destination-specific display information 561 in the destination-specific display information 559, the main control unit 201 acquires the same destination name and destination number as those in the original destination information 593 corresponding to the changed-destination information 594 determined to be the same in step S1007. In step S1009, the main control unit 201 adds the retransmission destination-specific display information 562 to the destination-specific display information 559 that has been determined to have the same destination name and destination number in step S1005 or to the destination-specific display information 559 acquired in step S1008. The main control unit 201 sets values corresponding to the destination name 521, the destination number 522, and the transmission result 523 in the individual destination information 520 acquired in step S1004 in the destination name, the destination number, and the transmission result in the retransmission destination-specific display information 562, respectively. In step S1010, the main control unit 201 adds the destination-specific display information 559. In addition, the main control unit 201 sets values corresponding to the destination name 521, the destination number 522, and the transmission result 523 in the individual destination information 520 of the FAX transmission history acquired in step S1004 in the destination name, the destination number, and the transmission result in the original destination-specific display information 561, respectively.

In step S1011, the main control unit 201 determines whether the destination processing has been performed on all the individual destination information 520 included in the FAX transmission history. If the main control unit 201 determines that the destination processing has been performed on all the individual destination information 520 included in the FAX transmission history (YES in step S1011), the operation proceeds to step S1012. If not (NO in step S1011), the operation returns to step S1004. In step S1012, the main control unit 201 refers to the latest transmission results in all the destination-specific display information 559 (including the original destination-specific display information 561 and/or the retransmission destination-specific display information 562), and determines whether any one of the results represents "Failure". In step S1012, if any one of the latest transmission results represents "Failure" (YES in step S1012), the operation proceeds to step S1013. Otherwise (NO in step S1012), the operation proceeds to step S1014. In step S1013, the main control unit 201 sets "Failure" in the summary status 553. In step S1014, the main control unit 201 sets "Success" in the summary status 553.

According to the present exemplary embodiment, the transmission result of a multi-address transmission is updated by transmission results by retransmission. Thus, by simply checking the result of the multi-address transmission in the summary status, the user can easily check whether transmission to all the destinations in the multi-address transmission has successfully been completed. As a result, easy-to-understand information can be displayed for users.

In a second exemplary embodiment, the same components as those of the first exemplary embodiment will be denoted by the same symbols and/or numerals. Thus, redundant description thereof will be avoided, as needed.

The user can retransmit a FAX by using a FAX transmission history in the FAX transmission UI 401 in FIG. 4. In such case, if there is no need to retransmit the FAX to a certain destination, the user can delete the destination by pressing the "Delete Address" button 404. After this deletion operation, if the user presses the "Transmit FAX" button 405, the main control unit 201 acquires the destination-specific display information list 558 in the retransmission-source FAX transmission history summary 550, and adds retransmission destination-specific display information 562 to the destination-specific display information 559 having the corresponding destination and destination number. Information "Cancel" representing that transmission is unnecessary is set in the transmission result in the added retransmission destination-specific display information.

Alternatively, retransmission to a certain destination may be canceled by using the detailed transmission history 710. More specifically, in such a case, the user selects a transmission history per destination and performs a cancellation operation. If the user performs a cancellation operation on an arbitrary destination, the main control unit 201 acquires the destination-specific display information list 558 in the FAX transmission history summary 550, and adds retransmission destination-specific display information 562 to the destination-specific display information 559 having the corresponding destination and destination number. Information "Cancel" representing that transmission is unnecessary is set in the transmission result in the added retransmission destination-specific display information.

If the user cancels transmission to all the destinations included in a multi-address transmission, the user may selects each transmission job history 701 in the transmission history summary 700 in FIG. 7A, and perform a cancellation operation. If the user performs a cancellation operation on an arbitrary transmission job history 701, the main control unit 201 acquires the destination-specific display information list 558 in the FAX transmission history summary 550, and adds retransmission destination-specific display information 562 to all the destination-specific display information 559. Information "Cancel" representing that transmission is unnecessary is set in the transmission result in the added retransmission destination-specific display information.

Figure 11:
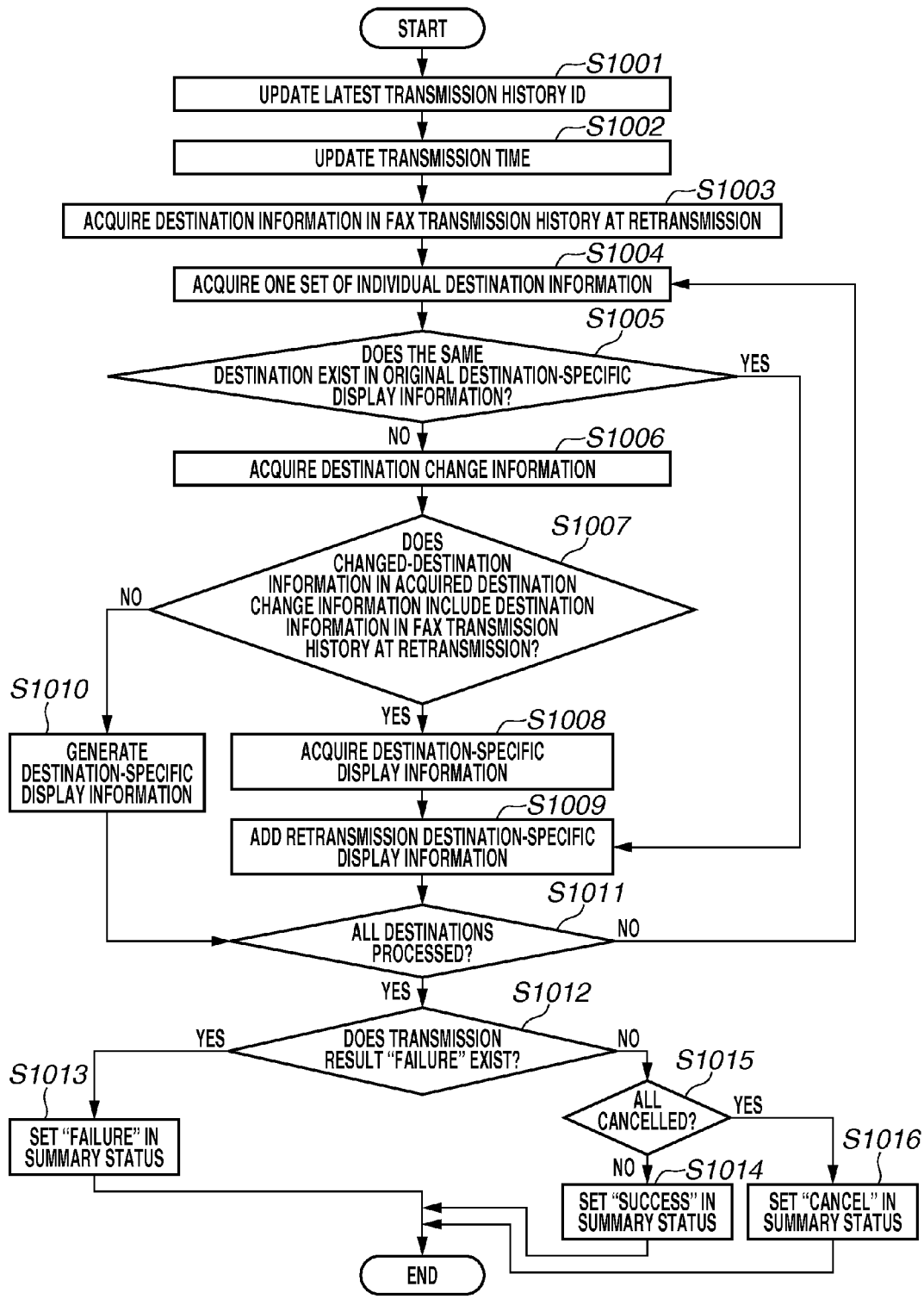
FIG. 11 is a flowchart illustrating FAX transmission history summary updating processing including a cancellation step.

FIG. 11 is a flowchart illustrating processing performed when the FAX transmission history summary 550 includes at least one transmission result "Cancel". In step S1015, the main control unit 201 determines whether all the transmission results represent "Cancel". If the main control unit 201 determines that all the transmission results represent "Cancel" (YES in step S1015), the operation proceeds to step S1016. If not, i.e., if the transmission results includes "Success" and "Cancel", the operation proceeds to step S1014. In step S1016, the main control unit 201 sets "Cancel" in the summary status 553.

According to the present exemplary embodiment, it is possible to display a status in a FAX transmission history in view of a destination for which the user determines retransmission is unnecessary.

In a third exemplary embodiment, the data management server 110 stores the FAX transmission history data 500 as a file. Other information processing apparatuses on the network or the Internet also share the FAX transmission history data 500 in the data management server 110. In addition, in the present exemplary embodiment as well, the same components as those of the first exemplary embodiment will be denoted by the same symbols and/or numerals. Thus, redundant description thereof will be avoided, as needed.

If the user presses the "Transmit FAX" button 405 in the FAX transmission UI 401 in FIG. 4 to perform retransmission by using a FAX transmission history, the information display unit 202 updates the display contents of the transmission history summary 700, as illustrated in FIG. 12. More specifically, the information display unit 202 displays information "RETRANSMITTING" representing that the image forming apparatus 111 is retransmitting the FAX in a corresponding status. In addition, the corresponding FAX transmission history summary 550 in the FAX transmission history data 500 is updated.

In addition, regarding the transmission job history 701 whose status is "RETRANSMITTING", the information display unit 202 disables the menu item "Retransmit FAX" in the context menu 750 so that the user cannot press this menu item. The following description will be made based on an example in which another information processing apparatus gives a FAX retransmission instruction and accordingly updates the corresponding FAX transmission history summary 550 in the FAX transmission history data 500 during the retransmission. In this case, if the information processing apparatus 101 acquires the FAX transmission history data 500 from the data management server 110, the another information processing apparatus disables the menu item "Retransmit FAX" in the context menu corresponding to the transmission job history 701 whose status is "RETRANSMITTING", as described above. In this way, the information processing apparatus 101 cannot give a retransmission instruction with the transmission job history 701 with which the another information processing apparatus is performing retransmission.

According to the present exemplary embodiment, it is possible to prevent a plurality of information processing apparatus users on the network or the Internet from simultaneously giving a FAX retransmission instruction. Thus, unnecessary FAX transmission can be prevented.

In a fourth exemplary embodiment as well, the same components as those of the first exemplary embodiment will be denoted by the same symbols and/or numerals. Thus, redundant description thereof will be avoided, as needed.

FIG. 13 is a flowchart illustrating processing for notifying a user of a warning when a FAX transmission history 501 includes a transmission result "Failure".

The processing may be started anytime when the user needs to be notified. For example, the processing may be started when the client application 200 is started or when the transmission history summary 700 is displayed.

In step S1301, the main control unit 201 acquires the FAX transmission history data 500, and searches for a FAX transmission history 501 including a transmission result "Failure". In this step, this search-target FAX transmission history 501 is a FAX transmission history 501 necessary for obtaining the summary status 553. For example, if the FAX retransmission has already been performed, a FAX transmission history 501 at the retransmission other than the retransmission-source FAX transmission history 501 is the search target. Next, in step S1302, the main control unit 201 determines whether a FAX transmission history 501 including a transmission result "Failure" exists. If the main control unit 201 determines that a FAX transmission history 501 including a transmission result "Failure" exists (YES in step S1302), the operation proceeds to step S1303. If not (NO in step S1302), the main control unit 201 ends the processing. In step S1303, the main control unit 201 acquires the name of the user currently using the client application 200, refers to the acquired user name and the sender name 563 in the FAX transmission history summary 550 including a transmission result "Failure", and determines whether these users are the same user. If these users are the same user (YES in step S1303), the operation proceeds to step S1305. If not (NO in step S1303), the operation proceeds to step S1304.

In step S1304, the main control unit 201 acquires the current time, calculates the elapsed time from the transmission time 507 to the current time, and determines whether a certain time or more has elapsed. If a certain time or more has elapsed (YES in step S1304), the operation proceeds to step S1305. If not (NO in step S1304), the operation proceeds to step S1306. The client application may uniquely determine the certain time. Alternatively, a setting dialog (not illustrated) may be displayed so that the user can set the certain time. Alternatively, the determination in step S1304 may be omitted. In such a case, if the above users are not the same user (NO in step S1303), the operation proceeds to step S1305.

In step S1305, the main control unit 201 notifies the information display unit 202 of the determination result in step S1303 and/or S1304, and the information display unit 202 displays a message notifying the user that a job that has failed in FAX transmission exists.

According to the present exemplary embodiment, when a plurality of users shares FAX transmission histories, any one of the users can immediately be notified of the users' own unsuccessful FAX transmission. In addition, each user can be notified of unsuccessful transmission by another user the certain time after the unsuccessful transmission. Thus, each user can efficiently be notified of a warning that needs to be checked by the users.

The exemplary embodiments described above can be realized by performing processing in which software (program) realizing the functions of the above exemplary embodiments is supplied to a system or an apparatus via a network or one of various types of storage medium, and a computer (CPU, a micro processing unit (MPU), etc.) in the system or the apparatus reads and executes the program.

By applying the configurations according to the above exemplary embodiments, information processing apparatuses can be used more easily.

While the exemplary embodiments of the present invention have thus been described, the present invention is not limited to such certain exemplary embodiments as described above. Various modifications/variations can be made within the gist of the present invention described in the claims.

The present invention enables displaying easy-to-understand information for users by updating the transmission result of multi-address transmission with a transmission result acquired by retransmission.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240035 filed Nov. 20, 2013, which is hereby incorporated by reference herein in its entirety.

What is claimed is:

1. An information processing apparatus comprising:
a transmission unit configured to transmit, to an image forming apparatus, instruction information for causing the image forming apparatus to perform FAX transmission;
an acquisition unit configured to acquire a result of the FAX transmission performed based on the instruction information from the image forming apparatus; and
a display unit configured to display, if the transmission unit transmits instruction information for a multi-address transmission for performing FAX transmission to a plurality of destinations and if the acquisition unit acquires a transmission result indicating failure of FAX transmission to at least one of the destinations, a summary, in a single record, of a transmission result of the multi-address transmission indicating failure of the multi-address transmission, and display, if the transmission unit transmits the instruction information for the multi-address transmission and if the acquisition unit acquires a transmission result indicating success of the FAX transmission to all the destinations, the summary, in the single record, of the transmission result of the multi-address transmission indicating success of the multi-address transmission, wherein the transmission unit transmits to the image forming apparatus instruction information for performing FAX transmission again to, among the destinations of the multi-address transmission, a retransmission target destination to which FAX transmission has failed, wherein the acquisition unit acquires a result of the FAX transmission performed based on the instruction information for performing the FAX transmission again to the retransmission target destination, and wherein the information processing apparatus further comprises an update unit configured to update the summary, in the single record, of the transmission result of the multi-address transmission including the retransmission target destination from failure to success if the result of the FAX transmission to the retransmission target destination acquired by the acquisition unit indicates that the FAX transmission by the retransmission has succeeded.

2. The information processing apparatus according to claim 1,
wherein the display unit displays a plurality of records each indicating success or failure of the FAX transmission to a different one of the plurality of destinations.

3. The information processing apparatus according to claim 1,
wherein the transmission unit displays a setting screen for setting the destinations, and
wherein, if the FAX transmission to the retransmission target destination is canceled by deleting the retransmission target destination from the setting screen including the retransmission target destination, the update unit updates the summary of the transmission result of the multi-address transmission from failure to success.

4. The information processing apparatus according to claim 1,
wherein the update unit updates, if the transmission results of the plurality of destinations consist of success and cancel, the summary of the transmission result of the multi-address transmission to success.

5. The information processing apparatus according to claim 1, further comprising:
a second acquisition unit configured to acquire FAX transmission history data including a FAX transmission history from an external information processing apparatus; and
a control unit configured to perform control so that an instruction for transmitting a FAX again is not accepted regarding a history including a status representing retransmitting in the FAX transmission history data.

6. The information processing apparatus according to claim 1, further comprising:
a third acquisition unit configured to acquire a user name of the information processing apparatus; and
a warning unit configured to provide a warning if the acquired user name matches a name of a user who has failed in FAX transmission in FAX transmission histories.

7. A control method comprising:
transmitting, to an image forming apparatus, instruction information for causing the image forming apparatus to perform FAX transmission;
acquiring from the image forming apparatus a result of the FAX transmission performed based on the instruction information; and
displaying, if the transmitted instruction information is for multi-address transmission for performing FAX transmission to a plurality of destinations and if the acquired transmission result indicates failure of FAX transmission to at least one of the destinations, a summary, in a single record, of a transmission result of the multi-address transmission indicating failure of the multi-address transmission, and displaying, if the transmitting transmits the instruction information for the multi-address transmission and if the acquiring acquires a transmission result indicating success of the FAX transmission to all the destinations, the summary, in the single record, of the transmission result of the multi-address transmission indicating success of the multi-address transmission, wherein the transmitting the instruction information for performing FAX transmission again to, among the destination of the multi-address transmission, a retransmission target destination to which FAX transmission has failed, wherein the acquiring acquires a result of the FAX transmission performed based on the instruction information for performing the FAX transmission again to the retransmission target destination, and wherein the control method further comprises updating the summary, in the single record, of the transmission result of the multi-address transmission including the retransmission target destination from failure to success if the result of the FAX transmission to the retransmission target destination acquired by the acquiring indicates that the FAX transmission by the retransmission has succeeded.

8. The control method according to claim 7,
wherein the displaying displays a plurality of records each indicating success or failure of the FAX transmission to a different one of the plurality of destinations.

9. The control method according to claim 7,
wherein a setting screen for setting the destinations is displayed in the transmitting, and
wherein, if the FAX transmission to the retransmission target destination is canceled by deleting the retransmission target destination from the setting screen including the retransmission target destination, the summary of the transmission result of the multi-address transmission is updated from failure to success in the updating.

10. The control method according to claim 7,
wherein, if the transmission results of the plurality of destinations consist of success and cancel, the summary of the transmission result of the multi-address transmission is updated to success in the updating.

11. The control method according to claim 7, comprising:
acquiring FAX transmission history data including a FAX transmission history from an external information processing apparatus; and
performing control so that an instruction for performing the FAX transmission again is not accepted regarding a history including a status representing retransmitting in the FAX transmission history data.

12. The control method according to claim 7, further comprising:
- acquiring as a second acquiring a user name of the information processing apparatus; and
- providing a warning if the acquired user name matches a name of a user who has failed in FAX transmission in FAX transmission histories.

13. A non-transitory computer-readable recording medium storing a program for causing a computer to perform a method comprising the steps of:
- transmitting, to an image forming apparatus, instruction information for causing the image forming apparatus to perform FAX transmission;
- acquiring from the image forming apparatus a result of the FAX transmission performed based on the instruction information; and
- displaying, if the transmitted instruction information is for multi-address transmission for performing FAX transmission to a plurality of destinations and if the acquired transmission result indicates failure of FAX transmission to at least one of the destinations, a summary, in a single record, of a transmission result of the multi-address transmission indicating failure of the multi-address transmission, and displaying, if the transmitting transmits the instruction information for the multi-address transmission and if the acquiring acquires a transmission result indicating success of the FAX transmission to all the destinations, the summary, in the single record, of the transmission result of the multi-address transmission indicating success of the multi-address transmission, wherein the transmitting the instruction information for performing FAX transmission again to, among the destination of the multi-address transmission, a retransmission target destination to which FAX transmission has failed, wherein the acquiring acquires a result of the FAX transmission performed based on the instruction information for performing the FAX transmission again to the retransmission target destination, and wherein the control method further comprises updating the summary, in the single record, of the transmission result of the multi-address transmission including the retransmission target destination from failure to success if the result of the FAX transmission to the retransmission target destination acquired by the acquiring indicates that the FAX transmission by the retransmission has succeeded.

* * * * *